Jan. 26, 1960  G. H. WASHBURN  2,922,948
STORAGE BATTERY CELL TESTER
Filed March 19, 1957
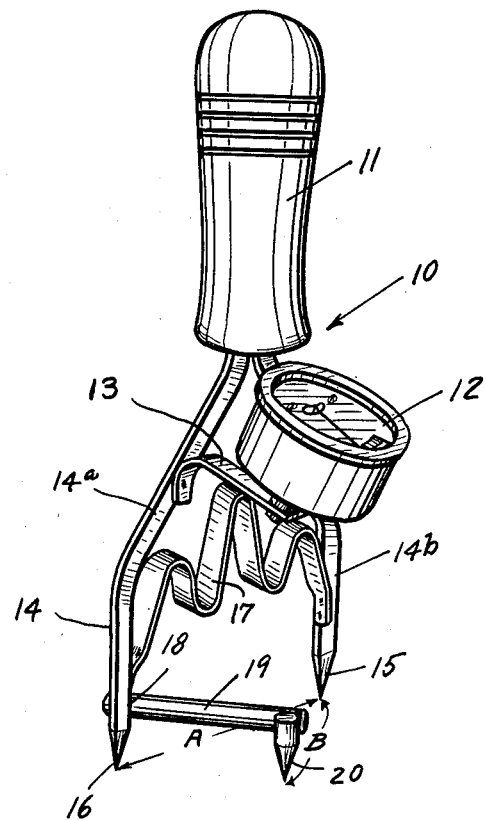
INVENTOR.
GEORGE H. WASHBURN.
BY
Lockwood, Galt, Woodard & Smith.
ATTORNEYS.

United States Patent Office 2,922,948
Patented Jan. 26, 1960

2,922,948
STORAGE BATTERY CELL TESTER
George H. Washburn, Kokomo, Ind.

Application March 19, 1957, Serial No. 646,997

4 Claims. (Cl. 324—29.5)

This invention relates to a storage battery cell tester for use in quickly locating defective cells.

Heretofore conventional battery cell testers have been characterized by prods that are so spaced as to make them usable only in connection with batteries having cells spaced apart uniform or identical distances. In those instances where the cells of one storage battery vary in their spacing from those of another battery, the two-prod non-adjustable tester has been inadequate. It is the primary object of the present invention to provide a tester which will be capable of use in testing cells in all batteries used in present-day motor cars. The primary feature of the present invention resides in the provision of an additional or third prod so that of the three adjacent prods thus provided there will always be two of them that are spaced equal to the spacing of the cells in all present-day motor car batteries.

The advantages of a cell tester are well known, they lying primarily in enabling a quick comparative test of each cell of a storage battery to be made. A comparison of the readings taken on the different cells is, of course, a good indication of the condition of the battery. A defective cell can be located quickly. But it is necessary, in order to realize these advantages, that a sturdy tester be provided which will always be available for effective use. It is, therefore, a further object of the present invention to provide a ruggedly constructed tester wherein the resistance metal, the meter brackets and the third prod are electrically welded thereby insuring permanent electrical connection.

It is a still further object of the present invention to provide a cell tester wherein it is unnecessary to make adjustments of the distance between prods. Heretofore, one way of solving the problem of varying distances between cells in different storage batteries has been by providing adjustable prods. These devices have had the disadvantage of loose connections from time to time and/or corrosion.

It is a still further object of the present invention to provide a cell tester that avoids the above-mentioned disadvantages and which presents no adjustable connections that may corrode or become loose.

The full nature of the invention will be understood from the accompanying drawings and the following description and claims.

In the drawings the figure is a perspective view of the invention.

In the drawings the cell tester is indicated generally at 10. It comprises the insulated handle 11, the meter 12, the conductive meter brackets 13 and the prods shown generally at 14. The ends or points of the prods are shown at 15, 16 and 20.

As will be observed from the figure, the prods are connected to the handle and the arms thereof 14a and 14b extend downwardly and outwardly therefrom in diverging relation to form a generally Y-shaped structure. The ends of the Y terminate in prod points 15 and 16 which are spaced apart the distances which the cells of many storage batteries are themselves spaced apart.

The resistance shunt 17 is provided to serve the usual function in devices of this character.

Connected to one of the prods at 18 by electric welding is the prod 19 from which depends a vertical portion terminating in the prod point 20. The distance between the prods 15 and 20 is equal to the distance separating the cells of many other storage batteries. It should be mentioned that the resistance shunt, the conductive meter brackets and the third prod are electrically welded thereby insuring permanent electrical connection.

In use the tester which is small and, of course, portable can make a quick comparative test of each cell of a storage battery. In the event the battery is characterized by cells separated distance A, the prods 15 and 16 may be used. On the other hand, in the event the cells are separated distance B, prods 15 and 20 will be used. As is apparent, it is unnecessary to make any adjustments and yet all batteries used in present-day motor cars can be easily and readily tested with the device.

It is also apparent from the construction and arrangement of parts that the third prod must be offset from a line drawn between prods 15 and 16. To state it another way, a line drawn through either prods 20 and 16 on the one hand or 20 and 15 on the other is at an angle, although not necessarily any particular angle to a line drawn through prods 15 and 16. Thus the tester may be tilted to place either prods 15 and 16 or prods 15 and 20 in position on the cells being tested.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected. For example, the third prod may be connected directly to the handle and only by wire to one of the other prods.

The invention claimed is:

1. In a two-pole cell tester for testing automobile storage batteries including a handle, a meter, a resistance shunt and a pair of prods spaced apart a predetermined distance equal to the spacing of cells in certain storage batteries, a third prod attached to and made an integral part of one of said pair of prods, said third prod being positioned to provide a spacing equal to the distance separating cells in certain other automobile storage batteries.

2. In a two-pole cell tester for testing automobile storage batteries including a handle, a meter, a resistance shunt and a pair of prods spaced apart a predetermined distance equal to the spacing of cells in certain storage batteries, one or more additional prods attached to and made an integral part of one of said pair of prods, said additional prods being positioned to provide various spacings equal to the distance separating cells in other automobile storage batteries.

3. In a two-pole cell tester for testing the cells of automobile storage batteries and including a handle, a meter and a pair of prods spaced apart a distance equal to the spacing of cells in certain automobile storage batteries, a third cell testing means comprising a substantially horizontal prod connected to one of said pair of prods, and having a depending extremity at that end that is remote from its point of connection to said first mentioned prod, said depending extremity being spaced from said first mentioned prod a distance equal to the distance separating cells in certain other automobile storage batteries.

4. In a two-pole cell tester for testing automobile storage batteries including a handle, a meter, a resistance shunt and a pair of prods spaced apart a predetermined distance equal to the spacing of cells in certain storage batteries, a third prod connected to one of said pair of prods, said third prod being disposed in offset relation to a line drawn through said pair of prods and being positioned to provide a spacing equal to the distance separating cells in certain other automobile storage batteries.

References Cited in the file of this patent

UNITED STATES PATENTS

| | | |
|---|---|---|
| 1,974,440 | Allen | Sept. 25, 1934 |
| 2,219,942 | Rowe | Oct. 29, 1940 |
| 2,463,567 | Samstag | Mar. 8, 1949 |
| 2,640,099 | Hull | May 26, 1953 |

FOREIGN PATENTS

| | | |
|---|---|---|
| 303,952 | Great Britain | Jan. 17, 1929 |
| 332,397 | Great Britain | July 24, 1930 |